May 30, 1967 W. M. BREITHAUPT 3,322,440
TRAILER WITH CASTER WHEELS AND VEHICLE THEREFOR
Filed Aug. 16, 1965 2 Sheets-Sheet 1
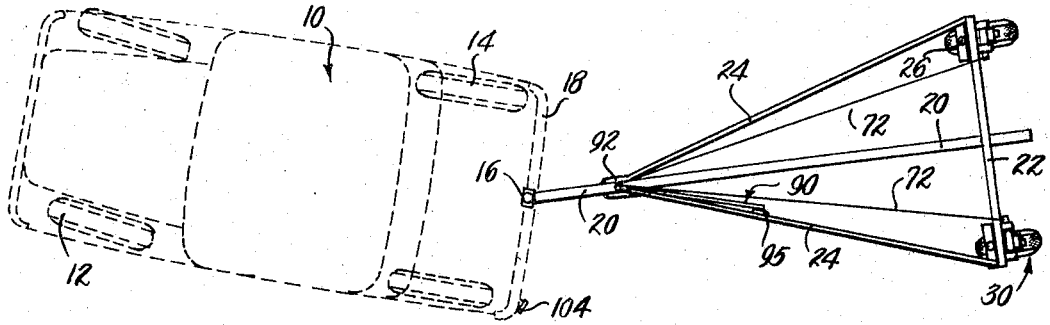
Fig.1.
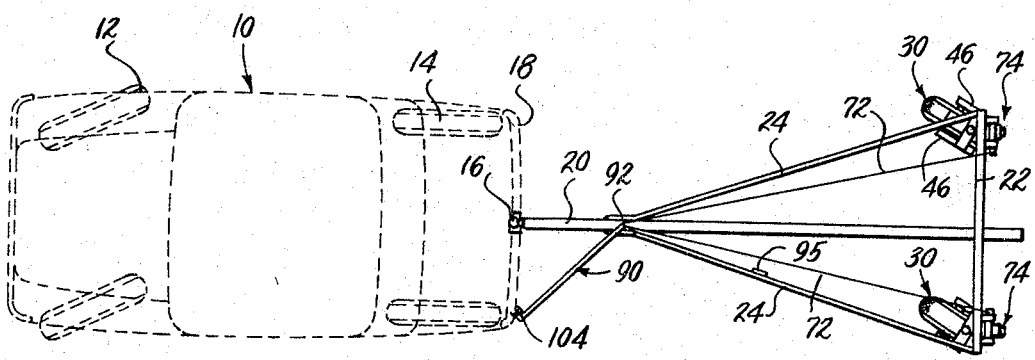
Fig.2.
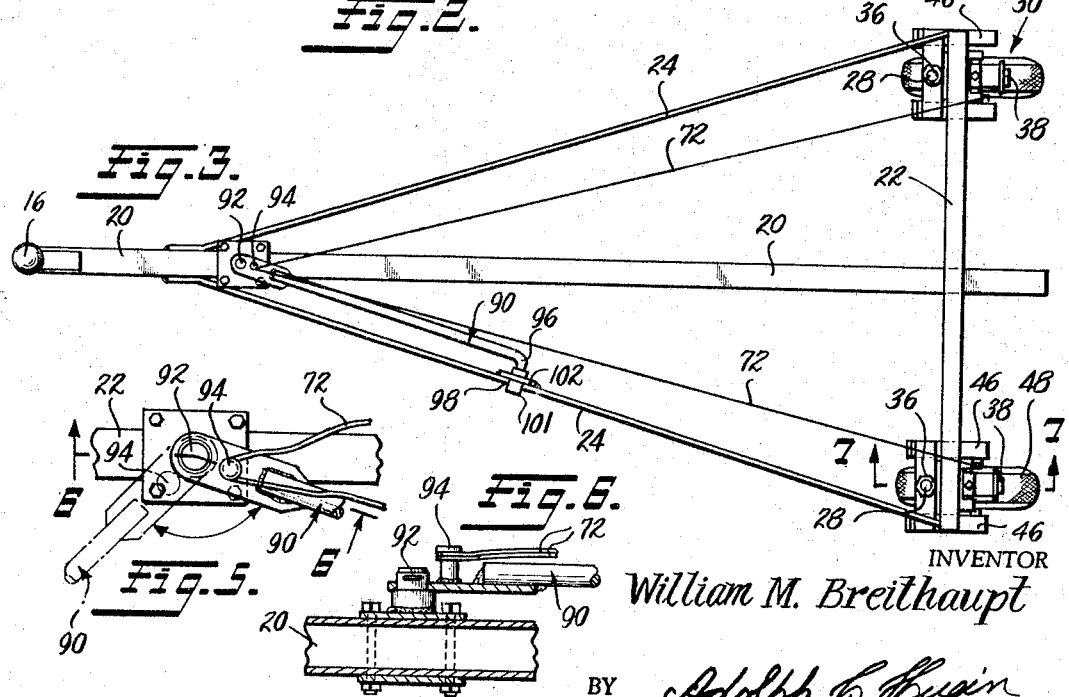
INVENTOR
William M. Breithaupt
BY Adolph C. Hugin
ATTORNEY May 30, 1967 W. M. BREITHAUPT 3,322,440
TRAILER WITH CASTER WHEELS AND VEHICLE THEREFOR
Filed Aug. 16, 1965 2 Sheets-Sheet 2
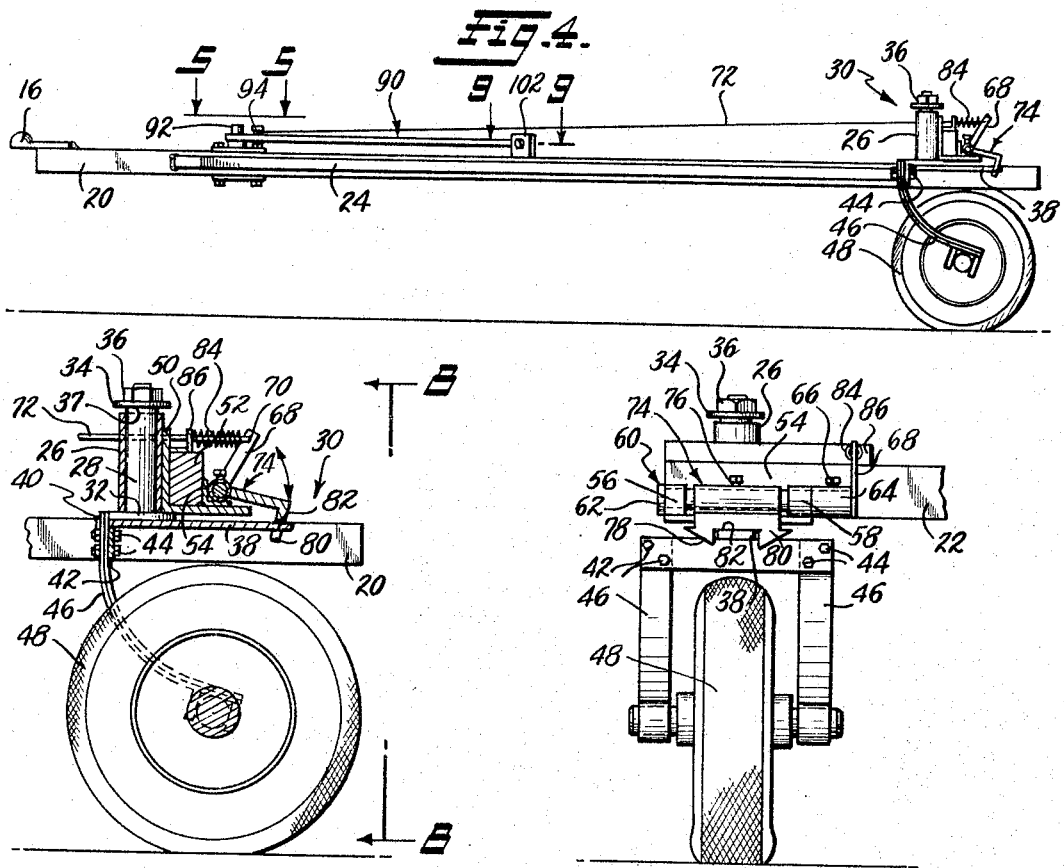
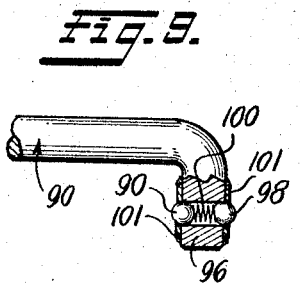
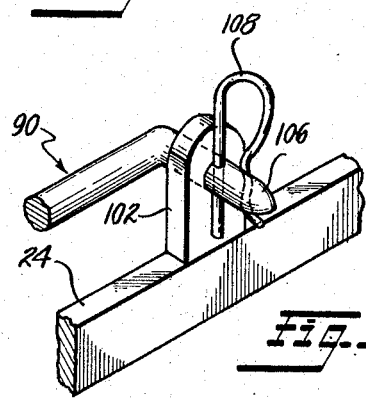
INVENTOR
William M. Breithaupt
BY Adolph C. Hugin
ATTORNEY

United States Patent Office 3,322,440
Patented May 30, 1967

3,322,440
TRAILER WITH CASTER WHEELS AND VEHICLE THEREFOR
William M. Breithaupt, 265 E. Elmwood,
Shreveport, La. 71104
Filed Aug. 16, 1965, Ser. No. 480,026
11 Claims. (Cl. 280—456)

This invention relates to trailers provided with casters and especially such trailers when combined with a vehicle.

It has been found desirable, where a trailer provided with casters has been hitched to a vehicle, to provide means pivotally to connect the trailer to the vehicle for normal pulling of the trailer by the vehicle along the highway and at the same time to lock the casters against swivelling in order to prevent untoward side sway of the trailer. Also in the past it had been found desirable, in backing up operations of the vehicle and trailer combination, to facilitate positioning of the trailer by locking the pivotal connection between the vehicle and trailer and simultaneously releasing the casters for swivelling movement.

In the prior art such control of the pivotal movement of the trailer and of the swivelling of the casters had been effected by complex means involving plural connections of flexible elements from the trailer to the vehicle and which failed to rigidify the trailer with the vehicle when pivotal motion between the two was intended to be inhibited.

It is therefore an object of the invention to provide rigid connection means between the trailer and the vehicle when it is desired to lock the trailer against pivotal movement with respect to the vehicle.

It is another object of the invention to use the control means which controls the trailer locking and caster swivelling actions as part of the means for rigidifying the trailer against pivotal movement.

A further object of the invention is to simplify the connections of the trailer to the vehicle.

Still another object of the invention is to provide a simple and effective means for locking the casters individually against swivelling movement.

Other objects will become apparent upon further consideration of the following specification when read in conjunction with the accompanying drawings in which:

FIG. 1 is a plan view of a vehicle, in diagrammatic form, to which is attached a trailer, with parts in position when the two are traveling forwardly around a curve along a highway.

FIG. 2 is a similar view with parts in position for backing up of the vehicle and trailer, the front wheels of the vehicle being swung for moving the trailer backwardly and laterally of its longitudinal axis.

FIG. 3 is an enlarged plan view of the trailer and of the connection thereof to the rear of the vehicle.

FIG. 4 is an elevational view of the portions shown in FIG. 3.

FIG. 5 is an enlarged fragmentary plan view of the locking bar and cable assembly taken along line 5—5 of FIG. 4.

FIG. 6 is a vertical sectional view taken along line 6—6 of FIG. 5.

FIG. 7 is an enlarged fragmentary vertical sectional view of one of the wheel mountings taken along line 7—7 of FIG. 3.

FIG. 8 is a rear elevational view of a wheel mounting taken along line 8—8 of FIG. 7;

FIG. 9 is an enlarged horizontal sectional view through the free end of the end of the control bar and latch taken along line 9—9 of FIG. 4; and FIG. 10 is an enlarged perspective view of another form of latch.

Now referring to the drawings in greater detail, at 10 is indicated a conventional vehicle, such as a passenger automobile, work truck, or the like provided with front steerable wheels 12 and rear wheels 14. A conventional trailer hitch 16 is provided which may be mounted on the rear bumper 18 of the vehicle.

The trailer comprises a framework or truss comprised of a central tongue 20 pivoted to the vehicle by means of the hitch 16, a cross bar 22 rigidly secured to the rear end of the tongue perpendicular thereto, and two truss beams 24 diverging from the front end of the tongue and terminating at the ends of the cross bar, the beams 24 being suitably rigidly secured to the tongue and cross bar so as to form a rigid frame unit.

The cross bar may be supported by any number of load supporting wheels or load supporting caster wheels intermediate the ends of the bar. However, each end of the cross bar 22 is provided with a vertical bearing 26 in which is pivotally positioned the pivot pin 28 of a lockable caster 30, as will be described, the pin being held in place by abutment of a washer 32 surrounding the pin engaging the lower face of the cross bar and a washer and nut arrangement 34, 36 on the upper end of the pin, the washer engaging the upper face of the bar and the nut being threaded on the upper end of the pin. A shoulder 37 on the pin supporting the washer prevents cramping of the pin against rotational movement within the bearing. A horizontal lock bar 38 in the form of a parallelepiped is rigidly secured to the lower end of each pin, and suitable wheel supports 46, such as duplex leaf springs, are fastened to the lock bar 38 between front and rear plates 40 and 42. The rear plate 42 is rigidly secured, as by welding, to the lock bar, and suitable bolts 44 fasten the plates 40 and 42 and the ends of the springs securely to the lock bar. This forms a resilient support for caster wheels 48.

Affixed to the rear of the cross bar, at each end thereof, is an angle bar 50 to which a block 52 is secured. To the rear end of the block and atop the horizontal web of the angle bar is a smaller angle bar 54 formed at each side end with a bearing, as bearings 56 and 58. A headed pivot pin 60 is mounted in these bearings to provide a pivotal support for a lock bar detent. Endwise movement of pivot pin 60 in one direction is prevented by engagement of the pin head 62 with the bearing 56 and in the other direction by a sleeve 64 secured to the pin 60 by a set screw 66. A detent operating arm 68 is rigidly secured to the sleeve 64 and is formed with an aperture 70 in its upper end for attachment to the end of an operating cable 72 to be referred to later in greater detail. The lock bar detent 74 is sleeved over the pin 60 and is fitted between the two bearings 56 and 58 and fastened to the pin 60 by a lock stud or set screw 76. The detent is provided with two prongs having laterally inclined cam faces 78 and 80, with a rectangular notch 82 formed therebetween of a size to fit snugly but not too tightly about the lock bar 38 to hold the bar, its associated pin 28, and caster wheel 48 against rotation after the caster has swung so as to bring the lock bar into parallelism with the longitudinal axis of the trailer. The detent is resiliently biased into locking position with the prongs thereof embracing the lock bar by a spring 84, compressed between a perforated ear 86 mounted on the block 52 and the upper end of the operating arm 68. If desired, each spring may be of the helical type and the cable 72 may be threaded through the helix and along its axis, as shown in FIG. 7.

The control mechanism for effecting the locking of the trailer against pivotal movement and the control of swivelling movement of the casters includes a control bar 90 pivoted by means of a pivot pin 92 to a forward portion of the tongue 20 close to the point of convergance of the two truss bars 24. The pivot pin is fixedly mounted on the tongue in any convenient fashion. Eccentric to the pivot pin 92 and mounted on the control bar is a peg or stud 94 to which is fastened the rear ends of the two cables 72 previously described. The spacing of the pivot pin 92 and stud 94 is such that when the control bar is shifted to lie substantially parallel with a truss bar 24, the cables will be sufficiently slack to release the arms 68 for free movement so as to permit locking engagement of the detents with the locking bars of the casters. In a second operated position of the control arm, it is swung about the axis of pivot pin 92 so that it lies in the position shown in FIG. 2 and is locked to the bumper as described in detail later. This provides a rigid triangular formation by reason of the rigidity of the control bar, the portion of the tongue between the pivot pin and the hitch, and the control bar. In this second position of the control bar, not only is the trailer locked to the vehicle against swinging movement, but the cables 72 are drawn taut and further pull detents 74 against the action of spring or springs 84, out of locking position or possible locking contact with the lock bars 38, thereby freeing the casters for swivelling movement.

To lock the control bar in its first position substantially parallel to truss bar 24, the end of the control bar is provided with a catch means engageable with a cooperating means on the truss bar 24. Conveniently, this catch means may comprise a bent end 96 on the control bar, FIG. 9, formed to house a pair of balls 98 pressed outwardly by a spring 100. The balls are held within the bent end of the control bar 90 by apertured side plates 101 fastened to the control bar with the apertures over the balls to permit the balls to move outwardly to a limited extent only. The truss bar 24 has affixed thereto an apertured latching plate 102 to snugly receive and retain the bent end of the control bar, so that it can be pressed through the aperture and be snapped into or out of locking engagement with the truss bar mounted plate, the control bar being springy enough to be able to be moved to proper engagement with the plate. As a modification, the bent end 96 may be bullet nosed, as shown at 106 in FIG. 10, the nose passing through an aperture in its plate 102, with the control bar being held in place by a cotter pin 108, one leg of which passes through a perforation in the end of the control bar and the other leg of which is bent so as to resiliently embrace the end of the control bar.

The bumper has fastened to it in any suitable fashion, as by clamps, a second apertured plate 104 which is angularly positioned as required to meet the bent end of the control bar as it is moved toward the bumper and releasably to hold the bar latched in its second position. The control bar is releasably held by the plate 104 in the same manner as by the plate 102 or by its engagement in the aperture in the plate 104.

Having thus described the invention, what is claimed as new is:

1. In combination, a vehicle and a trailer, first pivot means pivotally connecting said trailer to said vehicle, casters on said trailer and detent means to lock said casters against swivelling movement, second pivot means on the trailer, a control bar pivoted to said second pivot means, said second pivot means being offset from the first pivot means, connections between said control bar and the detent means whereby swinging of said control bar from a first position wherein the casters are free to swivel to a second position enables the caster to become locked against swivelling, and means on the vehicle offset from the first pivot means, engageable by the control bar in its second position to form a rigid structure of the trailer and vehicle.

2. The structure of claim 1 wherein the trailer includes a tongue running longitudinally of the trailer, said first and second pivot means being located on said tongue.

3. The structure of claim 1 wherein the trailer includes a tongue running longitudinally of the trailer, one end of the tongue being provided with said first pivot means and with said second pivot means adjacent thereto, the trailer also including a cross bar perpendicular to the tongue at the other end of the tongue with one of said casters at each end of the cross bar and the trailer further including truss bars inclined to the tongue, one in each side of the tongue rigidly connecting the ends of the cross bar with the tongue.

4. The structure of claim 3 wherein a truss bar is provided with a control bar catch means, and the control bar having means cooperating with the catch means on the control bar releasably to hold the control bar in substantial parallelism with said truss bar.

5. The structure of claim 4 wherein the means on the vehicle engageable by the control bar is a catch means similar to the catch means on the truss bar.

6. The structure of claim 1 wherein the detent means includes a horizontal bar secured to the caster, said caster having a pivot pin and said bar being oscillatable with said pivot pin, said detent means further including a pivoted detent and means biasing the detent toward engagement with the horizontal bar, the connections between the control bar and the detent means including cables connected to the detents and to the control bar at a point offset from the control bar pivot.

7. A trailer including a part at the forward end of the trailer provided with pivot means for attachment of the trailer to a vehicle, casters at the rear end of the trailer, detent means to prevent swivelling action of the casters and release means for the detent means, said release means including a control bar pivoted on said trailer at a point offset from the pivot means, connections between the control bar and the detent means, means on the trailer to retain the control bar in a first position wherein the connections enable the detent means to function as a locking means, the connections being such that when the control bar is swung to a second position the detent means is shifted to an inoperative position, and means at the free end of the control bar for rigidly connecting the bar with a portion on the vehicle offset from the pivot means.

8. The structure of claim 7 wherein the trailer includes a tongue running longitudinally of the trailer, said pivot means and said trailer pivot point of said control bar being located on said tongue.

9. The structure of claim 7 wherein the trailer includes a tongue running longitudinally of the trailer, one end of the tongue being provided with said first pivot means and with said control bar trailer pivot point adjacent thereto, the trailer also including a cross bar perpendicular to the tongue at the other end of the tongue with one of said casters at each end of the cross bar and the trailer further including truss bars inclined to the tongue, one in each side of the tongue rigidly connecting the ends of the cross bar with the tongue.

10. The structure of claim 9 wherein a truss bar is provided with a control bar catch means, and said connecting means at the free end of the control bar cooperating with the catch means releasably to hold the control bar in substantial parallelism with said truss bar.

11. The structure of claim 7 wherein the detent means includes a horizontal bar secured to the caster, said caster having a pivot pin and said bar being oscillatable with said pivot pin, said detent means further including a pivoted detent and means biasing the detent toward engagement with the horizontal bar, the connections between the control bar and the detent means including cables connected to the detents and to the control bar at a point offset from the control bar pivot.

References Cited

UNITED STATES PATENTS

| | | | |
|---|---|---|---|
| 2,475,174 | 7/1949 | Boone | 280—456 |
| 2,537,521 | 1/1951 | Forbes. | |
| 2,949,317 | 8/1960 | Zaha | 280—456 |
| 3,033,593 | 5/1962 | Zaha | 280—474X |

LEO FRIAGLIA, *Primary Examiner.*